H. JUNGE.
NON-SWARMING ATTACHMENT FOR BEEHIVES.
APPLICATION FILED NOV. 1, 1909.
965,910.
Patented Aug. 2, 1910.
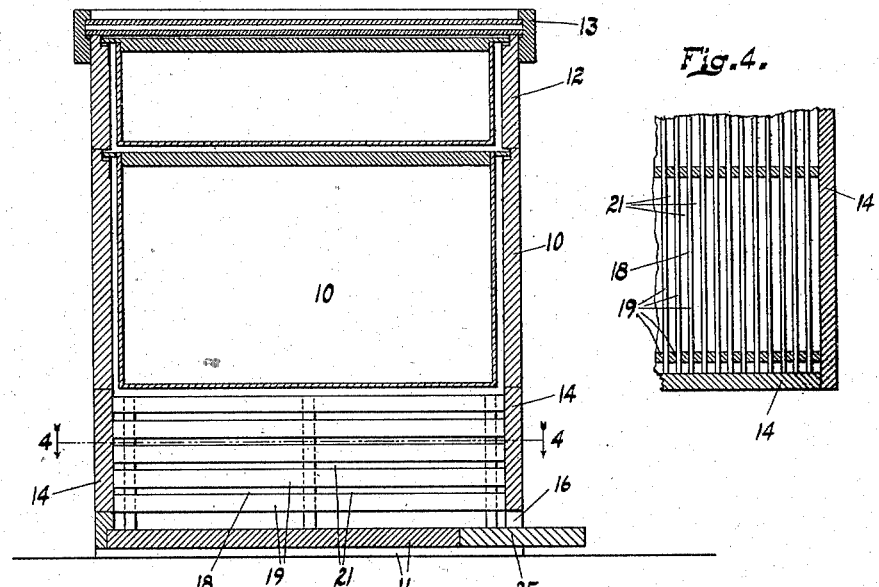
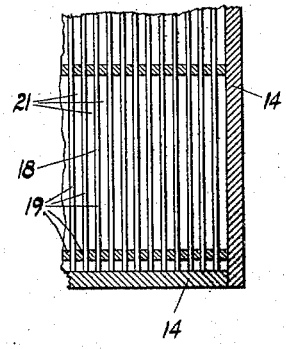
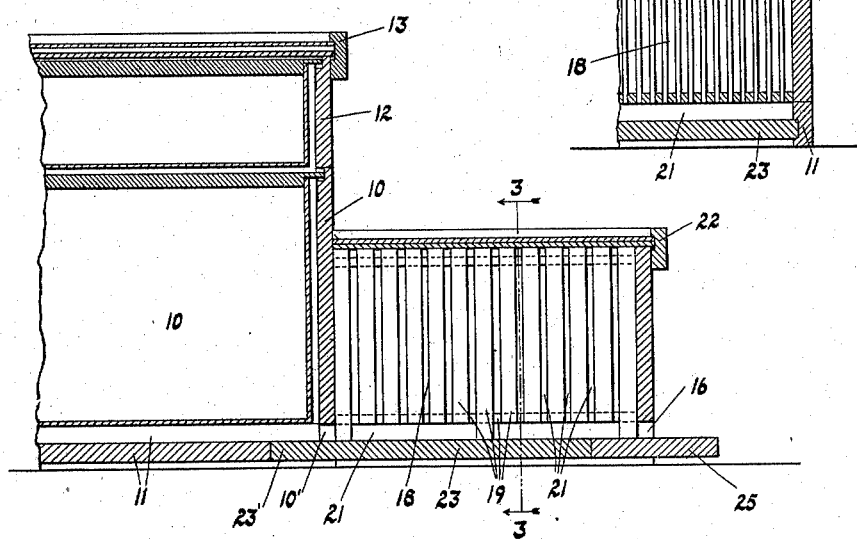
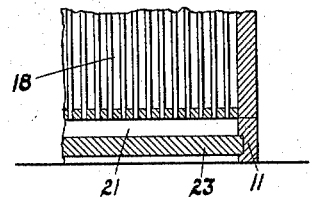
Witnesses
Walter Troemel.
Thomas W. McMeans
Inventor
Herman Junge.
By Bradford Hood,
Attorneys.

UNITED STATES PATENT OFFICE.

HERMAN JUNGE, OF CUMBERLAND, INDIANA.

NON-SWARMING ATTACHMENT FOR BEEHIVES.

965,910.  Specification of Letters Patent.  Patented Aug. 2, 1910.

Application filed November 1, 1909. Serial No. 525,697.

*To all whom it may concern:*

Be it known that I, HERMAN JUNGE, a citizen of the United States, residing at Cumberland, in the county of Marion and State of Indiana, have invented certain new and useful Improvements in Non-Swarming Attachments for Beehives, of which the following is a specification.

It is a well known fact that, when the number of bees within a hive increases to a point where the bees are too greatly crowded, queen cells will be immediately produced and, so soon as a new queen has been hatched, the old queen with a portion of the bees in the hive will swarm. Many devices have been produced for preventing this swarming action and it is common knowledge that swarming can be prevented by properly increasing the bee room in a hive at a time immediately prior to the hatching of the new queen and the swarming of the old. The undesirable feature of this method of swarm-prevention is that the bees will utilize the additional room for storing or brood rearing.

One of the most practical methods of providing the additional bee room above mentioned is to make a hive of such form that it may be readily expanded but such a hive construction is awkward in appearance and not usable in connection with that type of hive which has for many years been considered standard and which is, at the present time, most largely in use in this country.

The object of my present invention is therefore to produce a supplement for standard beehives of such form as may be readily attached to any hive so as to produce additional bee room which, however, cannot be utilized by the bees for comb-building but which will be merely usable as a sort of "sitting room" in which the additional number of bees may congregate.

The accompanying drawings illustrate my invention.

Figure 1 is a vertical section of a standard hive equipped with my non-swarming attachment as a bottom section arranged between the bottom board and the brooding chamber section; Fig. 2 a vertical section of a standard hive having my non-swarming attachment arranged at the entrance of the brooding chamber; Fig. 3 a section on line 3—3 of Fig. 2, and Fig. 4 a sectional plan on line 4—4 of Fig. 1.

In the drawings 10 indicates the brooding section of a hive, 11 the bottom board, upon which the brooding chamber ordinarily rests, 12 a comb frame one or more of which may be stacked one upon another on top of the brooding chamber 10, and 13 the storm proof cover usually provided. All of these parts are ordinary and standard construction with a bee entrance 10'.

In the form shown in Fig. 1 my non-swarming attachment comprises a section 14 substantially like the section 12 to mate with the lower end of the brooding chamber 10, and at its lower end is provided with a bee entrance 16. Arranged inside of section 14 and substantially filling said section, except for the usual bee passages immediately adjacent the inner faces of the walls of the section, is a cellular structure 18 composed of a plurality of alternately arranged crossed slats 19 so arranged upon one another that there will be formed between them a plurality of bee spaces or passages 21 each of which will have no cross section having a dimension so small that the bees will plaster it up or so large as to be available for honey storage; that is to say, each of the passages or spaces 21 must have all of its dimensions greater than about 3/16 of an inch and must have at least one of its dimensions not materially greater than 3/8 of an inch. This attachment comprising the section 14 and the internal cellular filler 18 fits readily beneath the brooding chamber 10 so that, whenever there are indications of a tendency to swarm, it is merely necessary to raise the brooding chamber and superposed parts from the bottom board 11 and place beneath the brooding chamber my attachment, whereupon the bees will enter the passage 16 and pass through the passages of the cellular structure 18 up into the brooding chamber and from thence into the comb chamber 12.

In the form shown in Fig. 2, the attachment is substantially identical with that shown in Fig. 1, differing from that form only in the provision of a cover 22, and a bottom board 23. The bottom board 23 at its rear end is projected at 23' so as to be projectible into the entrance of the brooding chamber 10 in place of the usual alighting board 25 and at its forward end the bottom board 23 does not extend clear to the entrance 16 in order to receive the alighting board 25. In this form the non-swarming attachment is placed on a level but in front of the usual entrance 10' with its lower bee passage 21 in register therewith so that the bees will enter entrance 16 and pass through the lower bee passage 21 of the cellular structure 18 and from thence through passage 10' into the brooding chamber 10 and from thence up into the comb chamber 12.

I claim as my invention:—

1. A non-swarming attachment for bee hives comprising a chamber which may be associated with the brooding chamber of a hive, said chamber having a cellular structure therein forming bee passages unavailable for comb building.

2. A non-swarming attachment for bee hives comprising an entrance chamber which may be associated with the brooding chamber of a hive at the entrance thereof, said chamber having a cellular structure therein forming bee passages unavailable for comb building.

3. A non-swarming attachment for bee hives comprising an open-ended section adapted to fit endwise with a brooding chamber of a hive, said chamber having arranged therein a cellular structure breaking the interior of the chamber up into bee passages unavailable for comb building.

4. A non-swarming attachment for bee hives comprising an open-ended section adapted to fit endwise with a brooding chamber of a hive to form an entrance thereto, said chamber having arranged therein a cellular structure breaking the interior of the chamber up into bee passages unavailable for comb building.

5. A non-swarming attachment for bee hives comprising a bottom board associatable with the brooding chamber of a hive, in place of the usual alighting board, a frame arranged upon said bottom board and having its interior broken up into a multiplicity of bee passages unavailable for comb building and having a bee passage registering with the entrance to the brooding chamber and also having a bee entrance, and a cover for said chamber.

6. A non-swarming attachment for bee hives comprising a bottom board associatable with the brooding chamber of a hive in place of the usual alighting board, a frame arranged upon said bottom board and having its interior broken up into a multiplicity of bee passages unavailable for comb building and having a bee passage registering with the entrance to the brooding chamber and also having a bee entrance, a cover for said chamber and means associated with the entrance to the non-swarming chamber for receiving the usual alighting board.

In witness whereof, I, have hereunto set my hand and seal at Indianapolis, Indiana, this twenty-ninth day of October, A. D. one thousand nine hundred and nine.

HERMAN JUNGE. [L. S.]

Witnesses:
ARTHUR M. HOOD,
THOMAS W. MCMEANS.